(12) United States Patent
Duval et al.

(10) Patent No.: US 12,463,835 B2
(45) Date of Patent: Nov. 4, 2025

(54) METHOD FOR GENERATING A PHYSICAL UNCLONABLE FUNCTION RESPONSE

(71) Applicant: THALES DIS FRANCE SAS, Meudon (FR)

(72) Inventors: Benjamin Duval, Saint Maximin (FR); Alexandre Berzati, Fuveau (FR); Olivier Fourquin, Fuveau (FR)

(73) Assignee: THALES DIS FRANCE SAS, Meudon (FR)

( * ) Notice: Subject to any disclaimer, the term of this patent is extended or adjusted under 35 U.S.C. 154(b) by 236 days.

(21) Appl. No.: 18/037,450

(22) PCT Filed: Nov. 17, 2021

(86) PCT No.: PCT/EP2021/082036
§ 371 (c)(1),
(2) Date: May 17, 2023

(87) PCT Pub. No.: WO2022/106491
PCT Pub. Date: May 27, 2022

(65) Prior Publication Data
US 2023/0344656 A1    Oct. 26, 2023

(30) Foreign Application Priority Data
Nov. 18, 2020   (EP) .................. 20306405

(51) Int. Cl.
*H04L 9/32* (2006.01)
*H03K 19/17768* (2020.01)

(52) U.S. Cl.
CPC ..... *H04L 9/3278* (2013.01); *H03K 19/17768* (2013.01); *H04L 2209/12* (2013.01)

(58) Field of Classification Search
CPC ............ H03K 19/17768; H04L 9/3278; H04L 2209/12
See application file for complete search history.

(56) References Cited

U.S. PATENT DOCUMENTS

| 8,415,969 B1 | 4/2013 | Ficke et al. |
| 2011/0317829 A1 * | 12/2011 | Ficke .................... H04L 9/3278 380/46 |

FOREIGN PATENT DOCUMENTS

EP    3668003 A1 *   6/2020   ........... H04L 9/3278

OTHER PUBLICATIONS

International Search Report (PCT/ISA/210) and Written Opinion (PCT/ISA/220) mailed on Feb. 4, 2022, by the European Patent Office as the International Searching Authority for current International Application No. PCT/EP2021/082036—[13 pages].

* cited by examiner

*Primary Examiner* — Tri M Tran

(57) ABSTRACT

Provided is a method for generating a physical unclonable function PUF response by a PUF circuit of an electronic device, said PUF circuit comprising pairs of electronic components called PUF primitives implementing said physical unclonable function, by obtaining a challenge (S1), generating PUF output bits (S2) by applying said physical unclonable function to said obtained challenge, and generating said PUF response (S3) from said generated PUF output bits verifying $\upsilon > \delta\upsilon + |T|$ or $\upsilon < -\delta\upsilon - |T|$ with $\delta\upsilon$ a predetermined threshold. In some embodiments it maximizes a PUF response entropy based only on the analog differential values generated by the comparators of the electronic device. Other embodiments disclosed.

4 Claims, 3 Drawing Sheets

METHOD FOR GENERATING A PHYSICAL UNCLONABLE FUNCTION RESPONSE

FIELD

The invention relates to the field of PUF applications and more particularly to a method for producing a PUF output which guaranties the stability of this output while maximizing its entropy.

BACKGROUND

Nowadays, cryptographic processes are routinely used in order to guaranty the security of our online operations: user authentication, online payments, authenticity verification, data protection etc., A major requirement of such processes is that their cryptographic key or private key remains secret. Therefore, since such a secret key is usually stored in some memory of the cryptographic device using it, numerous hardware and software protections have been designed in order to prevent an attacker to access such a secret key in a cryptographic device memory. Nevertheless, such protections have a cost, sometimes heavy, either in terms of occupied silicon area or computation time.

In order to lower the cost of protecting secret keys, solutions have been proposed in which a secret key is derived on demand from the output of a hardware function answering a challenge. In order to prevent an attacker from efficiently predicting the output of such a hardware function of a cryptographic device, it has been proposed to use Physically Unclonable Functions (PUF) whose output to a given stimulus uniquely depends on variations of the manufacturing process of the electronic circuits of the device implementing the PUF. The intrinsic PUF microstructures characteristics depend on random process variations during manufacture that are uncontrolled and cannot be monitored. Hence, when a physical stimulus is applied to the device components, they react in an unpredictable way due to the complex interaction of the stimulus with the physical microstructure of the components. Such a PUF is therefore easy to evaluate but practically impossible to predict or duplicate, even knowing the exact manufacturing process that produced it. As a result, such a PUF cannot be reproduced without altering its output. A specific challenge and its corresponding response together form a challenge-response pair which is specific to a given device and may be used for example as a cryptographic key, as a seed for cryptographic applications or for authentication of the PUF device.

A PUF of a chip may be based on its electronic components. For example a PUF output bit may be generated from the difference between electrical characteristic values of a pair of electronic components called primitives. Given the natural variations in the behavior of electronic components (especially due to environmental conditions like temperature or power supply), a PUF response may not always be the same for a given challenge. In order to avoid errors in a process based on a PUF response, such as authentication, such a challenge-response pair must remain stable over time despite many phenomena having an impact on PUF output: noise, variations of environmental conditions, ageing. . . . In order to prevent the output bits of a PUF from switching between 0 and 1 for the same challenge, bit selection methods have been designed in which only the more stable output bits of a PUF function are used for generating a PUF response. An existing method for making the PUF response to a reference challenge as steady as possible is to use for the PUF response only output bits for which primitives output difference is far enough from the 0/1 digitalization threshold. By doing so, small variations in primitive outputs difference for the selected bits, due to electronic noise for example, do not lead to a toggling of the output bits.

Such bit selection methods nevertheless have a major drawback of reducing the entropy of the PUF output. A major source of entropy decrease is the non-zero threshold of the analog to digital conversion generating the PUF output bits, which statistically leads to an imbalance between 0 and 1 in the PUF outputs of a large set of chips of identical design. Such an entropy reduction may enable an attacker to guess more easily the values of the output bits of the PUF function and pose a threat to the security of the cryptographic processes based on PUF outputs.

Therefore there is a need of a method and associated device for generating a PUF output which ensures the stability of the PUF output while maximizing its entropy.

SUMMARY

The invention aims at solving the above mentioned technical problem.

For this purpose and according to a first aspect, this invention therefore relates to a method for generating a physical unclonable function PUF response by a PUF circuit of an electronic device, said PUF circuit comprising pairs of electronic components called PUF primitives implementing said physical unclonable function and, for each PUF primitives pair, a comparator having as inputs electrical characteristic values of the PUF primitives of said PUF primitive pair, and configured for generating an analog differential value $\upsilon-T$ with $\upsilon$ a difference between said electrical characteristic values and T a non-zero current offset of said comparator, performing an analog to digital conversion of said analog differential value $\upsilon-T$, and outputting a PUF output bit equal to the result of said analog to digital conversion, said method comprising:
- obtaining a challenge,
- generating PUF output bits by applying said physical unclonable function to said obtained challenge,
- generating said PUF response from said generated PUF output bits verifying $\upsilon > \delta\upsilon + |T|$ or $\upsilon < -\delta\upsilon - |T|$ with $\delta\upsilon$ a predetermined threshold.

Such a method enables to produce a PUF response comprising statistically as many '0' than '1', which maximizes its entropy while still ensuring the stability of the PUF output bits used to generate the PUF response.

The step of generation said PUF response may comprise for each output PUF output bit:
- discarding the PUF output bit when $|\upsilon-T| < \delta\upsilon$,
- swapping said comparator inputs and discarding the PUF output bit when $|\upsilon+T| < \delta\upsilon$,
- generating said PUF response from undiscarded PUF output bits.

It enables to perform a selection maximizing the PUF response entropy based only on the analog differential values generated by the comparators of the electronic device.

$\delta\upsilon$ may be a standard deviation of said difference $\upsilon$ among a plurality of PUF primitive pairs of the electronic device.

According to a second aspect, the invention relates to an electronic device comprising a processor, at least one memory, and a physical unclonable function PUF circuit, said PUF circuit comprising pairs of electronic components called PUF primitives implementing a physical unclonable function and, for each PUF primitives pair, a comparator having as inputs electrical characteristic values of the PUF primitives of said PUF primitive pair, and configured for generating an analog differential value υ−T with υ a difference between said electrical characteristic values and T a non-zero current offset of said comparator, performing an analog to digital conversion of said analog differential value υ−T, and outputting a PUF output bit equal to the result of said analog to digital conversion, said electronic device being configured to perform the steps of the method according to the first aspect.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION

The invention aims at generating a physical unclonable function (PUF) response using a PUF circuit of an electronic device 10 in a way which ensures a stable PUF response and which at the same time increases the entropy of the PUF response compared to existing methods.

Figure 1:
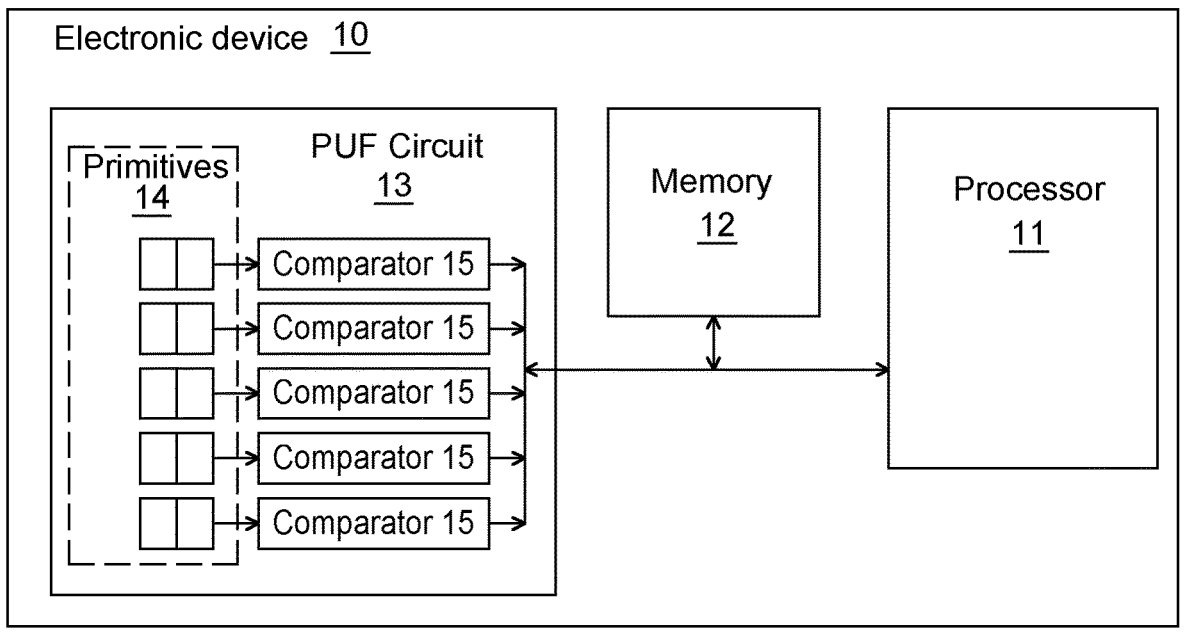
FIG. 1 depicts schematically an example of an electronic device according to the present invention.

As shown on FIG. 1, the electronic device 10 includes a processor 11 and at least one memory 12. It also include a PUF circuit 13 implementing the physical unclonable function and generating a PUF response from a challenge. The PUF circuit includes a plurality of active electronic primitives 14, called PUF primitives in the rest of the description, from which the PUF response will be generated. In this document, a primitive is an active electronic unit or electronic component. Preferably, the primitive is a basic electronic unit. For example primitives may be transistors, vias, resistances, capacitors, ring oscillators or SRAM cells.

In the following examples, the electronic device is a chip but it could be any other kind of integrated circuit, system-on-a-chip (SOC) or printed circuit board (PCB). It may for example be a RFID tag.

Each bit of a PUF response of a device including a PUF function is usually generated based on a comparison between electrical characteristic values of two primitives of the device forming a primitive pair. Such electrical characteristic values may for example be currents, voltages, resistance, capacitor. . . . In order to guarantee the unpredictability and uniqueness of the PUF function, such primitives are usually designed as identical but in fact behave slightly differently because of microstructure differences depending on random process variations during manufacture. The distribution of the electrical characteristics of a set of primitives usually follows a normal law. In order to perform such a comparison, the electronic device includes for each primitive pair a comparator 15 having as inputs electrical characteristic values of the PUF primitives of said PUF primitive pair. Such a comparator generates an analog differential value υ−T, with υ the difference between the electrical characteristic values of the primitive pair and T the offset of the comparator. It also performs an analog to digital conversion of the analog differential value υ−T which generates the PUF output bit for this pair of primitives.

Figure 2:
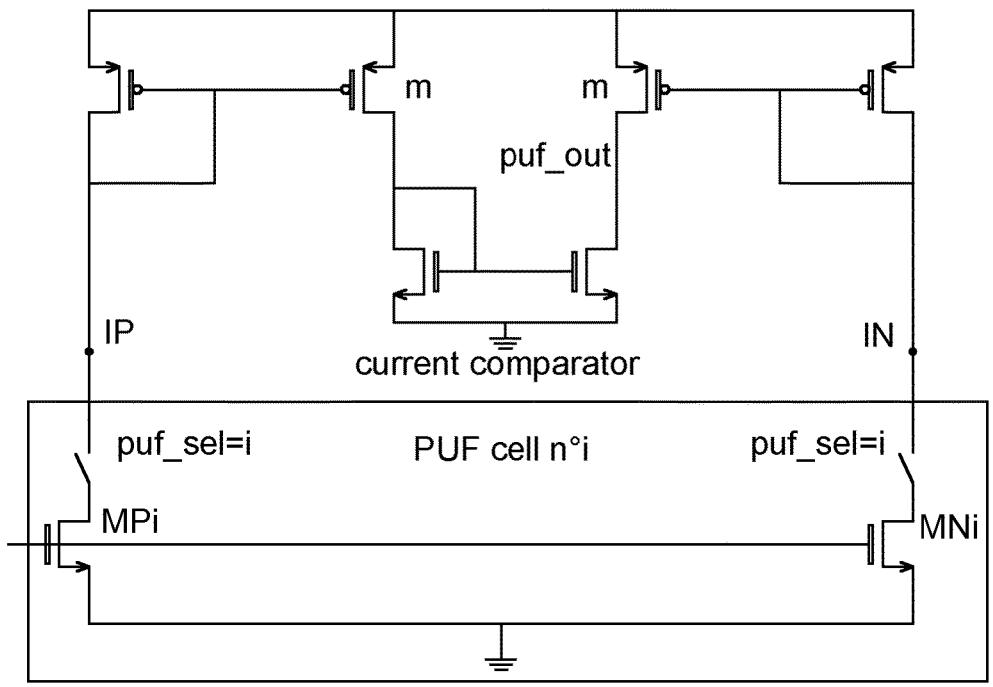
FIG. 2 depicts schematically an example of implementation of the circuits generating the PUF output bit puf_out for a pair of primitives MPi, MNi.

An example of implementation of the circuits generating the PUF output bit puf_out for a pair of primitives MPi, MNi is given on FIG. 2. In this example, the PUF primitives are transistors and the electrical characteristic values of the PUF primitives are the currents IP and IN flowing through the transistors. The difference υ may for example be equal to IP-IN.

When generating its output, the comparator induces a bias by adding a current offset T. As a result, as shown on FIG. 3, the output of the comparator, which is the voltage puf_out on FIG. 2:

is at a high level corresponding to an output bit equal to '1' when IP-IN-T>0;

is at a low level corresponding to an output bit equal to '0' when IP-IN-T<0.

Figure 3:
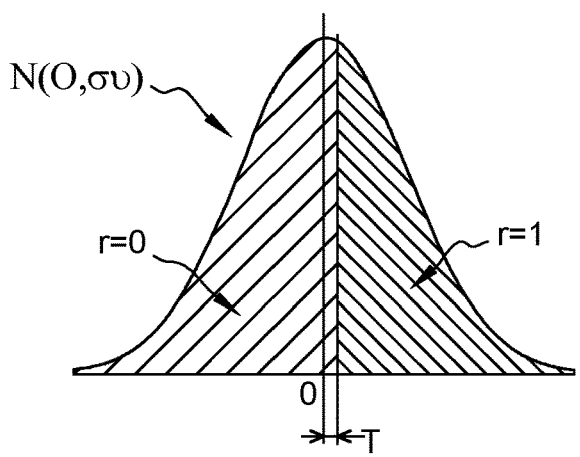
FIG. 3 is a schematic illustration of the bias induced by a comparator by adding a current offset when generating its output.

FIG. 3 shows the case where T>0, but T can equally be <0.

Since the assumption is made that the distribution of the electrical characteristics of a set of primitives follows a normal law, the difference υ also follows a normal law, centered on zero, as shown on FIG. 3, and when comparators of the PUF circuit output an output bit equal to '1' when υ>T only, there is an imbalance in the PUF output bits which are more often equal to '0' than equal to '1' when T>0, or more often equal to '1' than to '0' when T<0.

An output bit of the PUF may be unstable if the result of such a comparison varies, for example depending on environmental conditions such as temperature. As a result only the most stable output bits of the PUF shall be used for generating a stable PUF response. A usual way to ensure the stability of the PUF response is to discard the output bits for which the analog differential value generated by the comparator is close to zero. For example, given a predetermined threshold δυ, all the output bits for which |υ−T|<δυ may be discarded. The PUF response is then generated from the PUF output bits which were not discarded. The predetermined threshold δυ may for example be equal to the standard deviation of the difference υ among a plurality of PUF primitive pairs of the electronic device.

Figure 4:
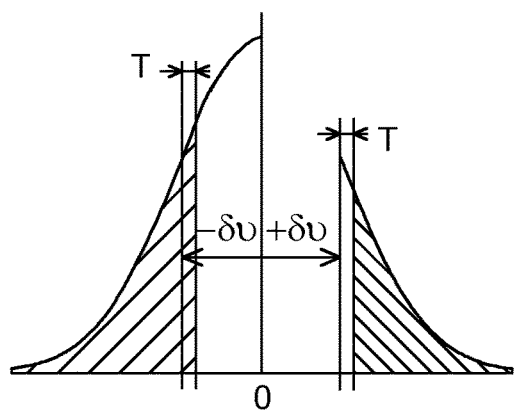
FIG. 4 is a schematic illustration of the selection of the output bits to be used for generating the PUF response inducing imbalance among zeros and ones among the PUF output bits as illustrated on FIG. 5.
Figure 5:
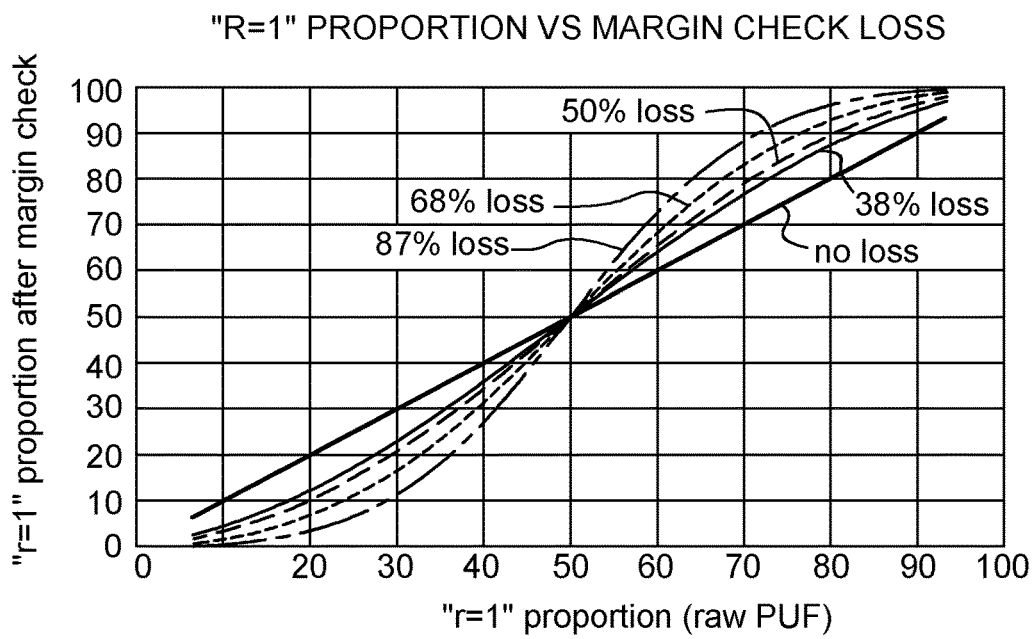

Nevertheless, such a selection of the output bits to be used for generating the PUF response still induces imbalance among zeros and ones among the PUF output bits since PUF output bits for which −δυ+T<υ<δυ+T are discarded, as shown on FIG. 4 when T>0. Such an imbalance of the selection amplifies the imbalance in the PUF response, as shown on FIG. 5, which reduces its entropy and can make it easier for an attacker to predict it.

In order to ensure a better entropy of the PUF response, the main idea of the method according to the invention is to discard additional PUF output bits compared to the selection method described above, such that statistically as many output bits for which υ<0 are discarded than output bits for which υ>0 are discarded. Such a selection will ensure that on average a PUF response will include as many '0' than '1' and has a maximum entropy.

Figure 6:
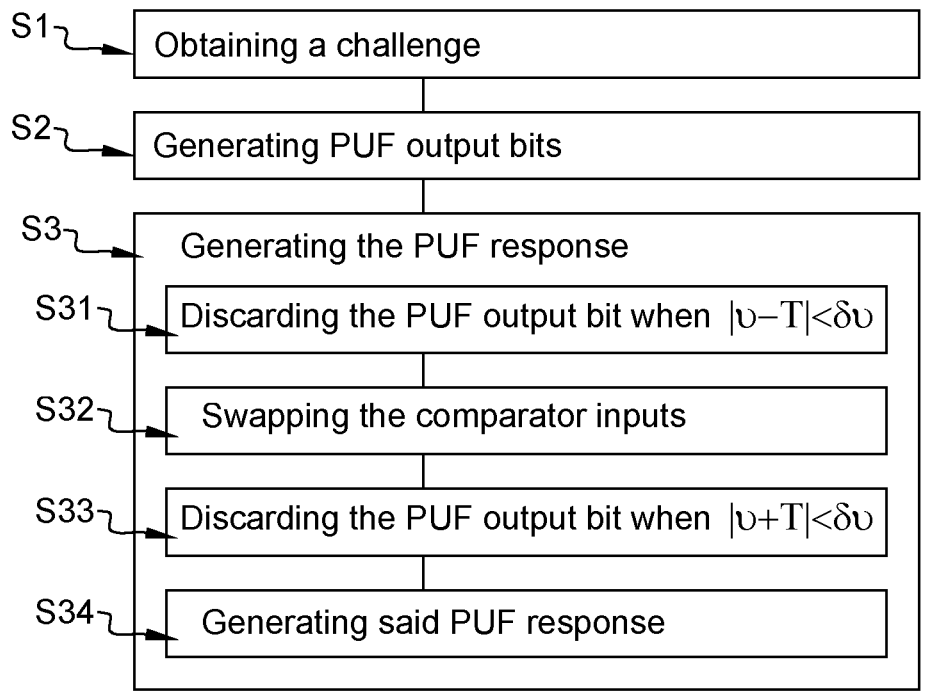
FIG. 6 is a schematic illustration of a method for generating a physical unclonable function (PUF) response according to an embodiment of the present invention.

The following paragraphs describe with more details the steps performed by the method according to the invention, as shown on FIG. 6.

In a first step S1, the PUF circuit obtains a challenge. Such challenge may be generated by the electronic device or it may be received by the electronic device from a remote device and transferred to the PUF circuit by the processor of the electronic device.

In a second step S2, the PUF circuit generates PUF output bits by applying the physical unclonable function to the obtained challenge. At this step, all the PUF output bits are generated by the comparators of the PUF circuit from the associated PUF primitives, regardless of how close the analog differential value $v-T$ generated by a comparator is close to zero.

Figure 7:
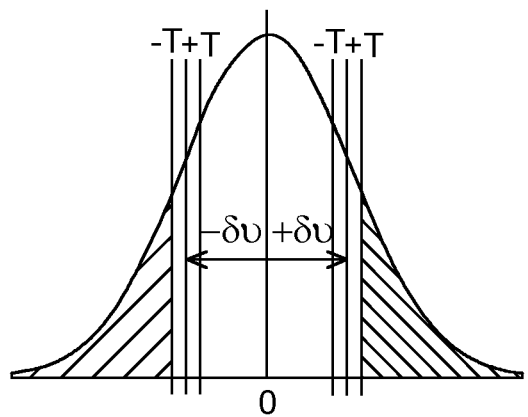
FIG. 7 depicts schematically is a schematic illustration of the selection of the output bits to be used for generating the PUF response according to an embodiment of the invention.

In a third step S3, the PUF circuit generates the PUF response only from the generated PUF output bits verifying $v>\delta+|T|$ or $v<-\delta v \div |T|$ with $\delta v$ a predetermined threshold. At this step, all the PUF output bits for which $|v|<\delta v+|T|$ are discarded and are not used for generating the PUF response. Such a selection of the PUF output bits is symmetrical with respect to zero, as shown on FIG. 7. Consequently, it induces no imbalance between '0' and '1' in the PUF response and it maximizes its entropy.

At the third step S3, the selection of the PUF output bits to be used for generating the PUF response is performed by the PUF circuit based on the analog differential value $v—T$ generated by each comparator. In order to determine the PUF output bits verifying $v>\delta v+|T|$ or $v<-\delta v-[T]$, the third step may comprise the following steps, performed for each generated PUF output bit:

- In a first substep S31, the PUF circuit may discard the PUF output bit when the absolute value of the analog differential value is below the predetermined threshold: $|v-T|<\delta v$. This is the usual selection operation presented here above, and which may induce a bias of the PUF response when no additional selection is performed.
- In a second subset S32, the PUF circuit swaps the inputs of the comparator generating the PUF output bit. By doing so, the analog differential value generated by each comparator is no more equal to $v-T$ but to $-v-T=-(v+T)$. In order to preserve the value of the PUF output bit, the value of the output of the comparator may be inverted.
- In a third substep S33, the PUF circuit discards the PUF output bit when $|v+T|<\delta v$. In order to do so, the PUF circuit just has to discard the PUF output bit when the absolute value of the analog differential value is below the predetermined threshold: $|-v-T|<\delta v$ which is equivalent to $|v+T|<\delta v$.

After performing the substeps S31 to S33 for all the PUF output bits, the PUF circuit has discarded all the PUF output bits for which $|v-T|<\delta v$ or $|v+T|<\delta v$. The remaining bits verify $|v-T|>\delta v$ and $|v+T|>\delta$; therefore they verify $v>\delta v+|T|$ or $v<-\delta v-|T|$.

In a fourth substep S34 of the third step S3, the PUF circuit generates the PUF response from undiscarded PUF output bits.

According to a second aspect, the invention relates to an electronic device 10 comprising a processor 11, at least one memory 12, and a physical unclonable function (PUF) circuit 13, said PUF circuit 13 comprising pairs of electronic components called PUF primitives 14 implementing a physical unclonable function and, for each PUF primitives pair, a comparator 15 having as inputs electrical characteristic values of the PUF primitives of said PUF primitive pair, and configured for generating an analog differential value $v-T$ with $v$ a difference between said electrical characteristic values and T a non-zero current offset of said comparator, performing an analog to digital conversion of said analog differential value $v-T$, and outputting a PUF output bit equal to the result of said analog to digital conversion, the electronic device being configured to perform the steps of the method for generating a PUF response described here above, as shown on FIG. 1.

Consequently, such a method enables to both ensure the stability of the PUF response and maximize its entropy.

The invention claimed is:

1. A method for generating a physical unclonable function (PUF) response by a PUF circuit of an electronic device,
    said PUF circuit comprising pairs of electronic components called PUF primitives implementing said physical unclonable function and, for each PUF primitives pair, a comparator having as inputs electrical characteristic values of the PUF primitives of said PUF primitive pair, and configured for generating an analog differential value $v-T$ with $v$ a difference between said electrical characteristic values and T a non-zero current offset of said comparator, performing an analog to digital conversion of said analog differential value $v-T$, and outputting a PUF output bit equal to the result of said analog to digital conversion,
    said method comprising:
        obtaining a challenge (S1),
        generating PUF output bits (S2) by applying said physical unclonable function to said obtained challenge, and
        generating said PUF response (S3) from said generated PUF output bits verifying $v>\delta v+|T|$ or $v<-\delta v-|T|$ with $\delta v$ a predetermined threshold.

2. The method according to claim 1, wherein the step of generation said PUF response (S3) comprises for each output PUF output bit:
    discarding (S31) the PUF output bit when $|v-T|<\delta v$,
    swapping (S32) said comparator inputs and discarding (S33) the PUF output bit when $|v+T|<\delta v$, and
    generating (S34) said PUF response from undiscarded PUF output bits.

3. The method according to claim 1, wherein $\delta v$ is a standard deviation of said difference $v$ among a plurality of PUF primitive pairs of the electronic device.

4. An electronic device comprising a processor, at least one memory, and a physical unclonable function (PUF) circuit, said PUF circuit comprising pairs of electronic components called PUF primitives implementing a physical unclonable function and, for each PUF primitives pair, a comparator having as inputs electrical characteristic values of the PUF primitives of said PUF primitive pair, and configured for generating an analog differential value $v-T$ with $v$ a difference between said electrical characteristic values and T a non-zero current offset of said comparator, performing an analog to digital conversion of said analog differential value $v-T$, and outputting a PUF output bit equal to the result of said analog to digital conversion,
    said electronic device being configured to perform method steps of:
        obtaining a challenge (S1),
        generating PUF output bits (S2) by applying said physical unclonable function to said obtained challenge, and generating said PUF response (S3) from said generated PUF output bits verifying $\upsilon > \delta\upsilon + |T|$ or $\upsilon < -\delta\upsilon - |T|$ with $\delta\upsilon$ a predetermined threshold.

\* \* \* \* \*